Aug. 9, 1949.　　E. F. PAXHIA ET AL　　2,478,705

AIRCRAFT LANDING GEAR

Filed June 24, 1946

INVENTORS
EMANUEL F. PAXHIA
GEORGE M. CASH
BY
Richard W. Treverton
ATTORNEY

Patented Aug. 9, 1949

2,478,705

UNITED STATES PATENT OFFICE 2,478,705

AIRCRAFT LANDING GEAR

Emanuel F. Paxhia, Kenmore, and George M. Cash, Hamburg, N. Y., assignors to Curtiss-Wright Corporation, a corporation of Delaware Application June 24, 1946, Serial No. 678,971

13 Claims. (Cl. 244—104)

This invention relates to aircraft landing gear and more particularly to a centering device for a swivel gear, such for example as the gear for the nose wheel of an aircraft provided with a tricycle landing gear.

As the weight and landing speeds of aircraft have increased, it has become necessary to center or to align castering wheels with the normal landing path of the aircraft. This is necessary in order to avoid imposition of excessive loads and to prevent starting of violent oscillation or shimmy of the wheel which may occur if a castering wheel is allowed to contact the ground while misaligned. Such oscillation not only imposes excessive loads on the structure but in some cases may result in loss of control of the aircraft. Centering of such a wheel is also necessary in cases of retractable gear in order that the wheel may properly enter the pocket into which it is retracted. In order to facilitate steering the aircraft on the ground it is desirable that the wheel be allowed to caster free of any centering action.

The present invention provides an improved centering arrangement by which the weight of the wheel or other means are effective to center the wheel when the aircraft is in flight, and in which the centering means are automatically released as the wheel makes contact with the ground. Centering is accomplished by a pair of complementary cams which are brought together, by linkage connected between fixed and extensible parts of the landing gear compression strut, when the latter are in their relatively extended relation occurring in flight; and which are separated to allow free castering of the wheel as soon as the strut is compressed on landing.

The arrangement provides for a relatively short stroke of the movable one of the cams, as compared with the operating stroke of the compression strut, with the result that the structure may be compact and of light weight. The foregoing and other objects and advantages of the invention will become apparent from the following description of the typical embodiment shown in the accompanying drawings, wherein.

Figure 4:
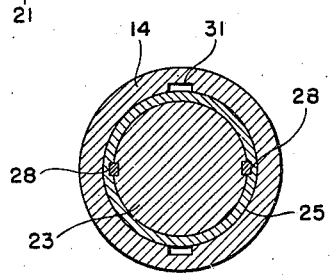
Figure 3:
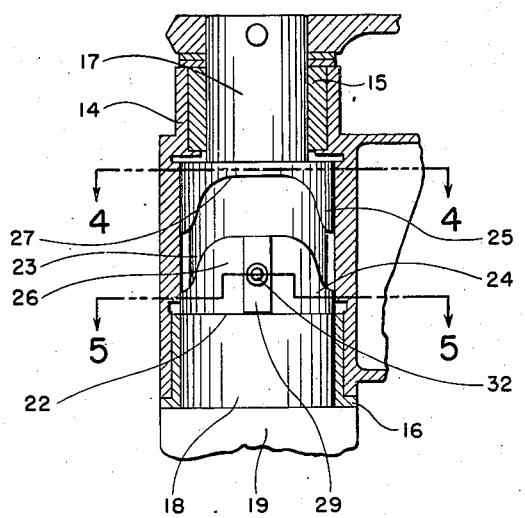
Fig. 3 is a vertical sectional view taken along line 3—3 of Fig. 2.
Figure 5:
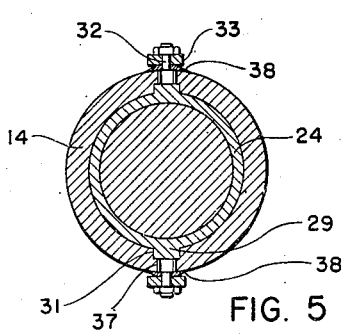

Figs. 4 and 5 are cross-sectional views taken along lines 4—4 and 5—5, respectively, of Fig. 3.

As shown in the drawings the supporting assembly of the gear comprises a telescoping shock strut 10 having a cylinder 11 and a piston 12 connected by a scissors linkage 13 for holding the telescoping parts against relative angular movement. To the lower end of member 12 is secured a housing 14 supporting bearings 15 and 16 for journals 17 and 18 of a castering swiveled fork 19 in which the landing wheel 21 or other landing element is mounted. As shown in Fig. 3 the journal 18 is provided with a shoulder 22 for thrust engagement upon the bearing 16.

Between bearings 15 and 16 and extending around intermediate portion 23 of the shank of the fork are a pair of cam sleeves 24 and 25, respectively provided with diametrically opposed cam lobes 26 and complementary cam recesses 27. Cam sleeve 25 is secured by suitable means, such as keys 28, to shank part 23 of the fork; while cam sleeve 24 is slidable and rotatable on part 23. It is also slidable within the bore of housing 14, but is held against rotation relative thereto by having splines 29 extending into grooves 31 in the housing side walls. Trunnions 32 carried by the cam sleeve 24 extend through slots 37 formed in the grooved portion of the housing side wall, and are connected by pivoted links 33 to lever arms 34 and 35. The latter are fixed to a transverse rock shaft 36 journalled on the housing 14. In order to seal the slots 37 against ingress of foreign matter, closure shields 38 are provided, being carried by the trunnions 32.

Figure 1:
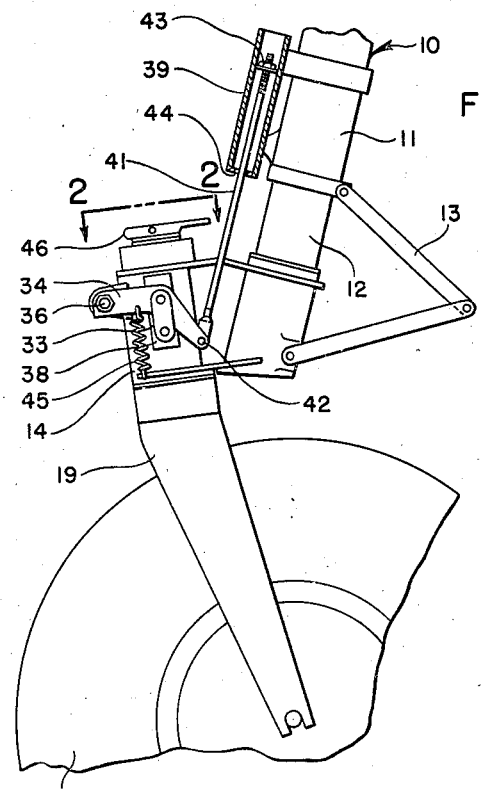
Fig. 1 is a fragmentary side elevation of a landing gear with certain parts appearing in section.
Figure 2:
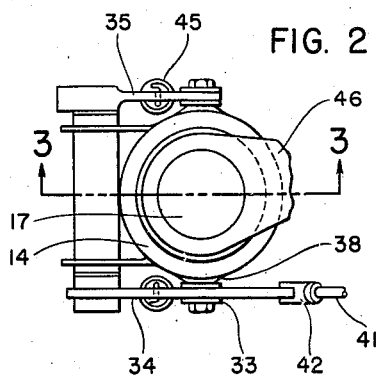
Fig. 2 is a fragmentary substantially plan view in the plane indicated at 2—2 in Fig. 1.

A tube 39 affixed to the shock strut cylinder 11 houses the upper end of a rod 41 which is pivoted at 42 to lever arm 34. The housed end of the rod has adjustably threaded thereto a nut or other stop member 43 for engagement with a shoulder 44 at the bottom of tube 39 when the shock strut piston 12 approaches fully extended relation to cylinder 11. In more retracted positions of piston 12 the stop 43 is spaced from the shoulder, as shown in Fig. 1. For holding the cam sleeve 24 spaced beneath cam sleeve 25, with cam surfaces 26, 27 fully disengaged, resilient means in the form of tension springs 45 are connected between the housing 14 and each of arms 34, 35.

In operation it will be understood that when no compressive load is applied to the shock strut 10, as when the aircraft is in flight, the members 11, 12 will be in extended relation; and that when such a compressive load is applied, as when the aircraft is supported on the ground by the landing gear, the members 11, 12 normally will be in the partially retracted relation shown in Fig. 1, the degree of retraction varying with the amount of load to enable the strut to absorb shocks incident to landing or travel of the aircraft over uneven ground. It will also be understood that, if desired, when in flight the entire landing gear assembly may be moved to a retracted position within the aircraft by suitable retraction means, not shown.

As the aircraft takes off and the shock strut approaches full extension, the stop 43 engages shoulder 44, so that during the terminal phases of the extension the lever arms 34, 35 are moved counterclockwise, bringing cam sleeves 24, 25 into engagement. During this action the cam lobes 24 will ride upon the surfaces of cam recesses 27, finally nesting therein, rotating the wheel carrying member 19 so that the wheel 21 is centered, that is, aligned with the longitudinal axis of the aircraft, and holding the fork-wheel assembly thus centered.

However, as soon as the shock strut is compressed or retracted the cam sleeve 24 will move to the disengaged position shown in the drawings, by action of both gravity and resilient means 45. Accordingly as soon as the aircraft's ground weight is upon the landing gear the fork is free to rotate in bearings 15, 16, so that there is no interference with steering of the aircraft on the ground.

It will be noted that by reason of the play connection afforded between the rod 41 and strut member 11 by stop elements 43, 44, and also by reason of the lever advantage provided by arm 34, the travel of the cam sleeve 24 is short relative to the normal telescoping movement of the strut element 12 between extended and retracted positions. Accordingly the cam surfaces 25, 27 may be small and the entire assembly may be encased in a housing 14 of small dimensions and light weight. Adjustment of the wheel centering mechanism, to render it operative and inoperative at the desired points of strut extension and retraction may be accomplished by adjusting the stop nut 43 axially along rod 41.

The arrangement may be applied either to a free castering swivel landing gear or to a gear whose swivel action is controlled by suitable snubbing, steering or other control means. For example an arm 46 secured to the shank of fork 19 may be extended to such control means if desired.

It will be understood that the structure and arrangement herein specifically shown and described are merely illustrative of the inventive principles involved, and that these principles may be otherwise embodied without departing from the spirit of the invention or the scope of the appended claims.

We claim:

1. In an aircraft landing gear, a compression strut comprising telescoping members, one of which is connected to the aircraft and another of which is retractable relative to the first mentioned member under ground load, a landing wheel carrying member having a shank swiveled to said other telescoping member, a centering cam sleeve affixed to said shank, a cooperating cam sleeve axially and angularly movable relative to said shank and keyed against rotation relative to said other telescoping member, a lever pivoted to the latter member and a pivoted link connecting the lever with said cooperating cam sleeve for moving the latter into and from engagement with said centering cam sleeve, a play connection between the lever and the telescoping member connected to the aircraft for effecting engagement of said cam sleeves upon extension of the strut, and resilient means between the lever and the other telescoping member for disengaging said cam sleeves upon retraction of the strut.

2. In an aircraft landing gear, a compression strut comprising telescoping members, one of which is connected to the aircraft and another of which is retractable relative to the first mentioned member under ground load, a landing wheel carrying member having a shank swiveled to said other telescoping member, a centering cam sleeve affixed to said shank, a cooperating cam sleeve axially and angularly movable relative to said shank and keyed against rotation relative to said other telescoping member, a lever pivoted to the latter member and a pivoted link connecting the lever with said cooperating cam sleeve for moving the latter into and from engagement with said centering cam sleeve, an adjustable play connection between the lever and the telescoping member connected to the aircraft for effecting engagement of said cam sleeves upon extension of the strut, and resilient means between the lever and the other telescoping member for disengaging said cam sleeves upon retraction of the strut.

3. In an aircraft landing gear, a supporting assembly comprising a first member connected to the aircraft and a second member retractable relative thereto under ground load, a landing wheel carrying member swiveled to the second member, wheel centering means comprising a first cam fixed to the wheel carrying member and a second cam engageable with the first cam, a lever pivotally connected to said second member and the second cam for moving the latter to and from a position of wheel centering engagement with the first cam, a play connection between the first member and the lever for effecting disengagement of the cams upon retraction of the supporting assembly, and resilient means for effecting engagement of the cams upon extension of the supporting assembly.

4. In an aircraft landing gear, a supporting assembly comprising a first member connected to the aircraft and a second member retractable relative thereto under ground load, a landing wheel carrying member swiveled to the second member, wheel centering means comprising a first cam fixed to the wheel carrying member and a second cam engageable with the first cam, a lever pivotally connected to said second member and the second cam for moving the latter to and from a position of wheel centering engagement with the first cam, an adjustable play connection between the first member and the lever for effecting disengagement of the cams upon retraction of the supporting assembly, and resilient means for effecting engagement of the cams upon extension of the supporting assembly.

5. In an aircraft landing gear, a supporting assembly comprising a first member connected to the aircraft and a second member retractable relative thereto under ground load, a landing element carrying member swiveled to the second member, centering means comprising a first cam fixed to said carrying member and a second cam engageable with the first cam, a lever pivotally connected to said second member and to the second cam for moving the latter relative to the second member to and from positions of centering engagement with the first cam, and a connection between the lever and said first member for effecting disengagement of said cams upon retraction of the supporting assembly.

6. In an aircraft landing gear, a supporting assembly comprising a first member connected to the aircraft and a second member retractable relative thereto under ground load, a landing element carrying member swiveled to the second member, centering means comprising a first cam fixed to said carrying member and a second cam engageable with the first cam, and a play connection between the first member and the second cam for moving the latter relative to the second member from engagement with the first cam upon retraction of the supporting assembly.

7. In an aircraft landing gear, a supporting assembly comprising a first member connected to the aircraft and a second member retractable relative thereto under ground load, a landing element carrying member swiveled to the second member, centering means comprising a first cam fixed to said carrying member and a second cam engageable with the first cam, and an adjustable play connection between the first member and the second cam for moving the latter relative to the second member from engagement with the first cam upon retraction of the supporting assembly.

8. In an aircraft landing gear, a supporting assembly comprising a first member connected to the aircraft and a second member retractable relative thereto under ground load, a landing element carrying member swiveled to the second member, centering means comprising a first cam fixed to said carrying member and a second cam engageable with the first cam, a play connection between the first member and the second cam for moving the latter relative to the second member from engagement with the first cam upon retraction of the supporting assembly, and means to effect engagement of the cams upon extension of the supporting assembly.

9. In an aircraft landing gear having a member displaceable under ground load, a landing element carrying member connected by swivel means to the aircraft, centering means comprising relatively movable and engageable cam elements associated with the swivel means, a lever for effecting relative movement of the cam elements into and from centering relationship, and means for moving the lever in response to movement of said displaceable member under decreasing and increasing ground loads respectively.

10. In an aircraft landing gear having a member displaceable under ground load, a landing element carrying member connected by swivel means to the aircraft, centering means comprising relatively movable and engageable cam elements associated with the swivel means, a lever for effecting relative movement of the cam elements into or from centering relationship, and means including a play connection for moving the lever in response to movement of the displaceable member in approaching and departing from the unloaded position thereof, the play connection freeing the centering means from the displaceable member during other phases of the latter's motion.

11. In an aircraft landing gear, a supporting assembly comprising a first member connected to the aircraft and a second member retractable relative thereto under ground load, a landing wheel mounting member swiveled to the second member, wheel centering means comprising a cam part and a cam follower part one of which is carried by the wheel mounting member and the other of which is carried by the second member, and an operating lever for moving one of said parts relative to the second member into and from centering engagement with the other of said parts, said lever being pivoted to the second member and operated by the relative movement of the first and second members to disengage said parts from centering relationship when the supporting assembly is under ground load.

12. In an aircraft landing gear, a supporting assembly comprising a first member connected to the aircraft and a second member retractable relative thereto under ground load, a landing wheel mounting member swiveled to the second member, wheel centering means comprising a cam part and a follower part one of which is carried by the wheel mounting member and the other of which is carried by the second member, and a play connection between the first member and one of said parts for moving it into and from centering engagement with the other of said parts, said play connection effecting the movement into and from centering engagement respectively only during the terminal phase of extension and the initial phase of retraction of the second member, and said play connection providing for movement of the second member free of the centering means during other phases of extension and retraction.

13. In an aircraft landing gear, a member connected to the aircraft body, a member carrying a landing wheel, and an intermediate member connected to the aforementioned members for transmitting ground loads between the landing wheel and the aircraft body, said intermediate member having a shock absorbing connection with one member of said aforementioned members providing for substantially vertical relative movement, said intermediate member having a swivel connection with the other member of said aforementioned members providing for turning of the landing wheel about a substantially upright axis, a pair of cam elements adapted to be engaged for centering the landing wheel about the swivel axis, said cam elements being non-rotatably mounted respectively on the intermediate member and said other member, means connecting said one member with one cam element for engaging it with the other cam element to effect said centering of the landing wheel upon movement of said one member to its limit position relative to the intermediate member in the direction resulting from removal of ground load from the landing gear, said connecting means including a play connection providing for movement of said one member relative to the intermediate member free from said one cam element when the landing gear is under ground load.

EMANUEL F. PAXHIA.
GEORGE M. CASH.

REFERENCES CITED

The following references are of record in the file of this patent:

UNITED STATES PATENTS

| Number | Name | Date |
| --- | --- | --- |
| 2,379,173 | Miller | June 26, 1945 |
| 2,394,496 | Stephan | Feb. 5, 1946 |

FOREIGN PATENTS

| Number | Country | Date |
| --- | --- | --- |
| 465,714 | Great Britain | May 13, 1937 |